Dec. 11, 1956 R. J. NEBESAR 2,773,792
METHOD OF MAKING A LAMINATED STRUCTURE
Filed June 19, 1953 3 Sheets-Sheet 1
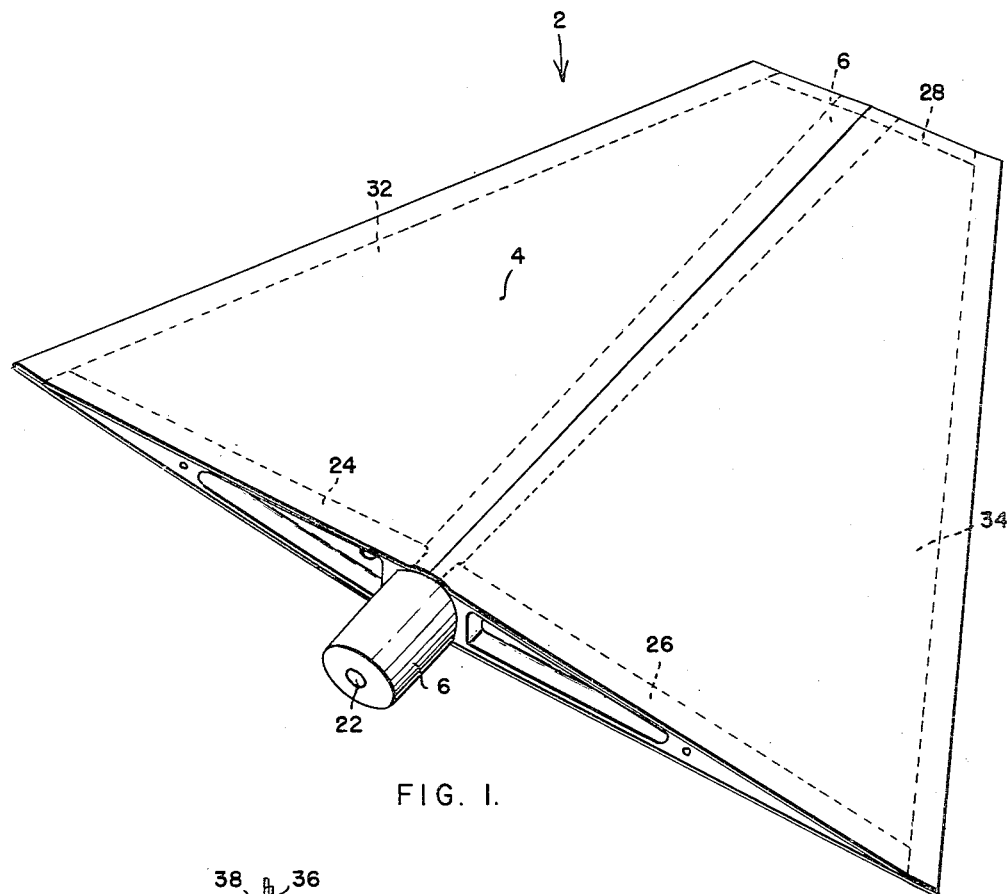
FIG. I.
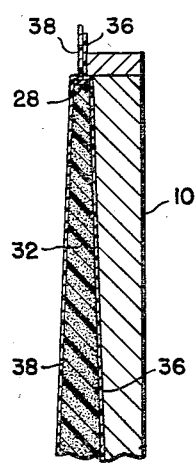
FIG. II.
INVENTOR.
ROBERT J. NEBESAR
BY
ATTORNEYS Dec. 11, 1956  R. J. NEBESAR  2,773,792
METHOD OF MAKING A LAMINATED STRUCTURE
Filed June 19, 1953  3 Sheets-Sheet 2

INVENTOR.
ROBERT J. NEBESAR
BY
ATTORNEYS

Dec. 11, 1956    R. J. NEBESAR    2,773,792
METHOD OF MAKING A LAMINATED STRUCTURE
Filed June 19, 1953    3 Sheets-Sheet 3

INVENTOR.
ROBERT J. NEBESAR
BY
ATTORNEYS

United States Patent Office 2,773,792
Patented Dec. 11, 1956

2,773,792

METHOD OF MAKING A LAMINATED STRUCTURE

Robert J. Nebesar, Bristol, Tenn., assignor to Universal Moulded Products Corporation, Bristol, Va., a corporation of Delaware Application June 19, 1953, Serial No. 362,740

1 Claim. (Cl. 154—110)

This invention relates to the method of making a laminated structure having particular utility as an airfoil section.

The object of this invention is to provide a novel method of making a laminated structure having a high degree of strength and yet of light weight.

A further object of this invention is to provide a novel method of making a strong, light airfoil section.

A still further object of this invention is to provide a method of making an airfoil section which is light and yet has a strong, hard skin.

The method in accordance with this invention forms a laminated structure through the repeated use of a single mold. A resin impregnated fabric spar is placed in the selected mold, the spar conforming to the shape of the mold where the spar is in contact with the mold members. The spar is surrounded with a cellular plastic and the mold member is compressed in order to conform the cellular plastic to the spar and to the mold. The spar and the cellular plastic is then surrounded by a pair of resin impregnated fabric sheets and, utilizing the same mold, the sheets, the spar and the cellular plastic are molded together to form a unitary structure. The sheets utilized are sufficiently large so as to overlie the spar and the cellular plastic and extend beyond them at at least two edges of the structure so as to be in contact with each other with no lamination in between.

If desired, the structure can be further strengthened by the use of synthetic resin ribs, the ribs being properly shaped to conform to the shape of the mold and secured to the spar prior to the placing of the cellular plastic in the mold.

In the formation of the spar, it is preferred to use a woven fiberglass sheet. However, other fabric sheets, such as, for example, asbestos, cotton, etc. may be used.

Any suitable cellular plastic having a weight of from 4 to 10 pounds per cubic foot and a compressive strength of not less than 50 pounds per square inch can be used. This cellular plastic is frequently referred to as "expanded plastic." Cellular cellulose acetate produced by extrusion, foamed polyurethane, expanded polystyrene, expanded phenolic resins are satisfactory. Such cellular or expanded plastics are well known. Reference may be had, for example, to "Modern Plastics Encyclopedia," 1949, at p. 335 and the references cited therein. Alternatively, resins such as, for example, polyurethane, an epoxy resin such as the condensation product of epichlorohydrin and 2,2-p-hydroxyphenylpropane ("Epon") and phenolic resins can be foamed within the closed mold utilizing foaming agents such as azoisobutyrodinitrile and azodihexahydrobenzodinitrile in a manner well known to the art.

The surrounding fabric sheets will preferably be of woven fiberglass. However, other fabric such as, for example, asbestos or cotton, can be used. The resin used to impregnate the surrounding sheets and the spar may be, for example, a polyester resin.

If it is desired to use ribs, they may be made of any suitable resin, such as, for example, polyester resins, such as those disclosed in Ellis Patent No. 2,255,313, issued September 9, 1941, a formaldehyde resin, such as phenol formaldehyde, urea formaldehyde, phenol-furfural, an acrylic resin, such as methyl methacrylate or cyclohexyl methacrylate, a vinyl resin, such as polyvinyl chloride, polyvinylidene chloride; styrene, polystyrene, or the like. Such resins may, if desired, be reinforced with a filler such as, for example, glass fibers, asbestos, cotton, or other similar fibers.

Where used, the ribs will preferably be secured to the spar with a synthetic resin adhesive which sets at room temperature. Exemplary of such adhesives are resorcinol-formaldehyde ("Resorsabond R-11"), phenol modified resorcinol-formaldehyde ("Resorsabond R-12"), urea formaldehyde ("Permaweld 55"), furan, a phthalic or maleic acid ester of a polyalcohol, such as glycerol or ethylene glycol and furfuryl alcohol-furfural.

The final molding step will be carried out at a temperature within the range of 70° F. to 350° F. and under a pressure of from 10 p. s. i. to 50 p. s. i. It will be appreciated that the temperature and pressure will vary depending upon the resin selected.

The method will be further clarified by the following description in conjunction with the drawings, in which:

Figure 1 is a perspective view of a completed airfoil section made in accordance with the method of this invention.

Figure 11 is a vertical section taken on the plane indicated by the line 11—11 in Figure 2, after the addition of the fabric sheets.

Figure 2:
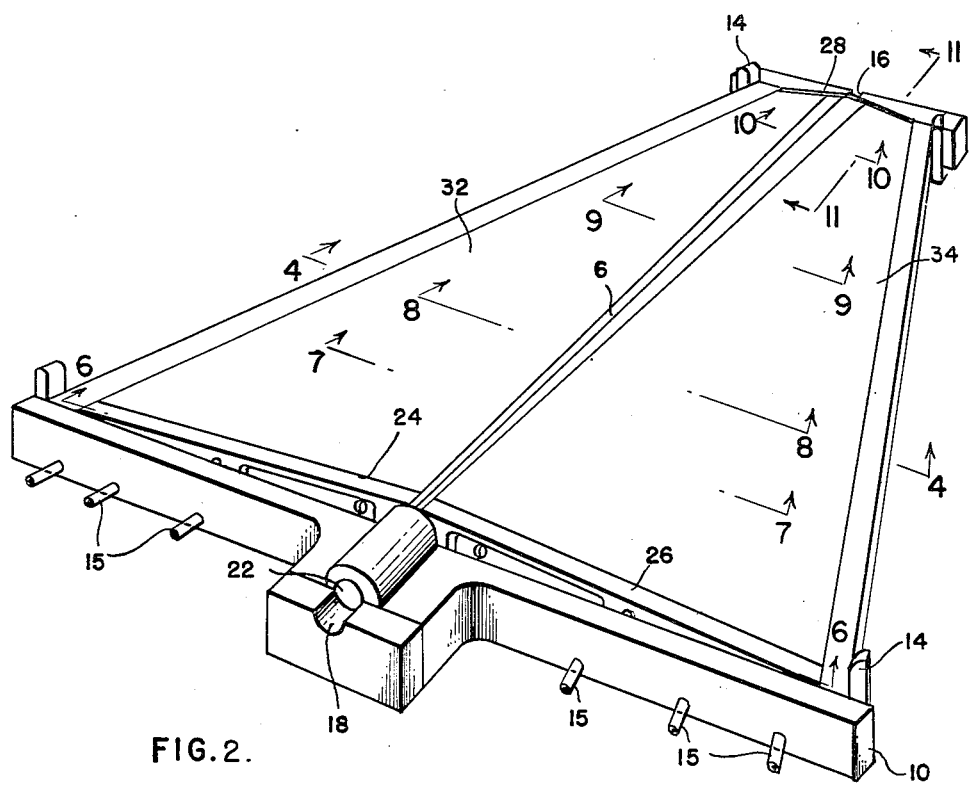
Figure 2 is a perspective view showing a partially completed airfoil section in the lower half of the mold just prior to the addition of the outer skin.
Figure 3:
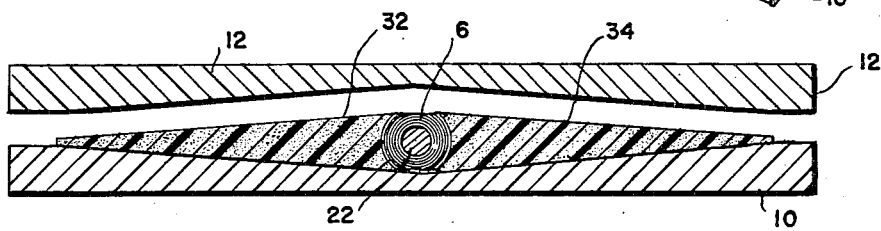
Figure 3 is a vertical section through the mold after the molding of the airfoil cores and prior to the addition of the fabric sheets, the top of the mold being shown lifted slightly above the lower half of the mold.
Figure 4:
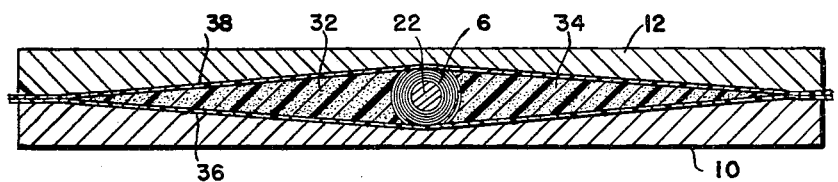
Figure 4 is a section taken on the plane indicated by the line 4—4, Figure 2, after the addition of the fabric sheets, showing the top of the mold in place.

By way of specific exemplification, a completed airfoil is shown in Figure 1. As shown in Figure 1, the airfoil 2 has an outer skin 4 and a spar 6.

The airfoil 2 was formed by the use of a mold having a bottom 10 and a mating top 12. Mold bottom 10 has ears 14 adapted to engage the sides of mold top 12 and steam passages 15 for heating the mold. With the exception of ears 14, mold top 12 is identical with mold bottom 10. Mold bottom 10 has cut-out portions 16 and 18 which match with the corresponding openings (not shown) in mold top 12.

Figure 5:
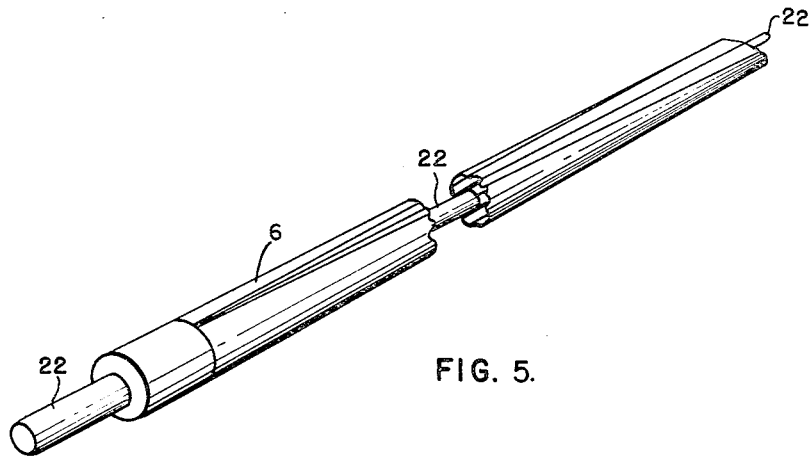
Figure 5 is a perspective view of the spar and the molding core with the spar partly broken away.
Figure 10:
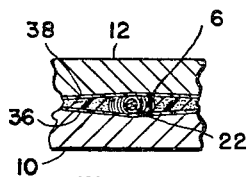
Figure 10 is a vertical section taken on the plane indicated by the line 10—10 in Figure 2, after the addition of the fabric sheets, showing the top of the mold in place.
Figure 9:
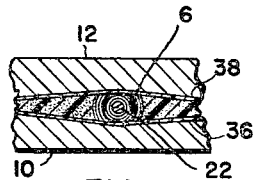
Figure 9 is a vertical section taken on the plane indicated by the line 9—9 in Figure 2, after the addition of the fabric sheets, showing the top of the mold in place.
Figure 8:
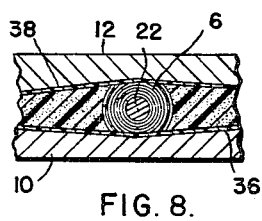
Figure 8 is a vertical section taken on the plane indicated by the line 8—8 in Figure 2, after the addition of the fabric sheets, showing the top of the mold in place.
Figure 7:
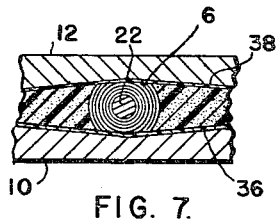
Figure 7 is a vertical section taken on the plane indicated by the line 7—7 in Figure 2, after the addition of the fabric sheets, showing the top of the mold in place.
Figure 6:
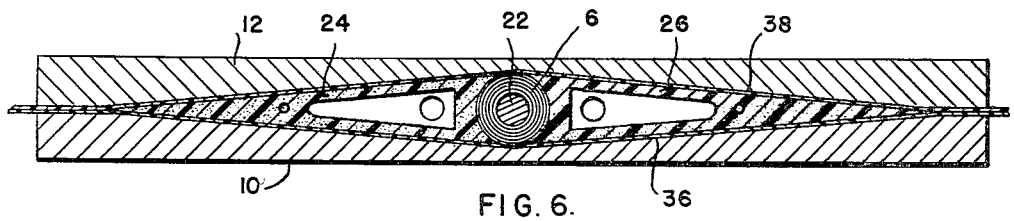
Figure 6 is a vertical section taken on the plane indicated by the line 6—6 in Figure 2.

The formation of central spar 6 is accomplished by winding a resin-impregnated fiberglass sheet on a tapered steel rod 22. After the resin-impregnated sheet has been wound on tapered rod 22 and before the resin sets, rod 22 has its ends respectively placed in openings 16 and 18 in mold bottom 10 and the mold top 12 is placed over mold bottom 10 and the mold sections forced together while the mold is simultaneously heated to cure the resin. The curing time will, of course, vary depending upon the resin selected. At the completion of this step, the spar 6 will have the shape shown in Figure 5.

Ribs 24 and 26 are prefabricated from, for example, fibrous glass reinforced polyester or phenolic resins to conform to the contour of mold bottom 10 and mold top 12 and to tightly encompass spar 6. After the curing of spar 6 and the removal of mold top 12, ribs 24 and 26 are positioned as shown in Figure 2 and cemented to spar 6 by a suitable synthetic resin adhesive setting at room temperature. Similarly, a flat fiberglass resin rib 28 is cemented to the tapered end of spar 6.

Cellular plastic cores 32 and 34 are now positioned on mold bottom 10. Cores 32 and 34 are precut so as to abut against spar 6, rib 28 and ribs 24 and 26, respectively, and so as to terminate inside the contour section of mold bottom 10. Cores 32 and 34 have a maximum thickness which is approximately equal to the maximum depth of spar 6 and are tapered to approximately conform to the total cavity of mold bottom 10 and mold top 12.

The cores 32 and 34 now being in place, the mold top 12 is replaced and pressure without heat is exerted thereon in order to conform the core members 32 and 34 to the shape of the mold and the shape of the spar.

The previously molded parts are now all removed and a resin-impregnated fiberglass fabric sheet 36 is laid over mold bottom 10, mold bottom 10 having preferably been precoated with the impregnating resin. The previously molded parts are then reassembled on mold bottom 10 over sheet 36. A fiberglass fabric sheet 38, impregnated with resin, is then placed over the thus assembled molded members and the top mold member 12 preferably precoated with the impregnating resin. Sheets 36 and 38 extend at least to the sides of mold bottom 10 and mold top 12, where they overlap core members 32 and 34 and thus are joined directly together to form the edges of the airfoil. Lengthwise, sheets 36 and 38 are precut to exactly overlie ribs 24, 26 and extend over rib 28. Together sheets 36 and 38 form outer skin 4.

Mold top 12 is now replaced and heat and pressure applied to complete the molding operation of the airfoil.

After curing, the edges of sheets 36 and 38, now outer skin 4, are trimmed to the desired profile to complete the airfoil.

What is claimed is:

The method of forming a laminated structure which comprises forming a resin-impregnated fabric spar, molding said spar together with cellular plastic in a mold to conform the cellular plastic to the spar and to the mold, subsequently surrounding said spar and cellular plastic with a pair of resin-impregnated fabric sheets and molding the sheets, the spar and the cellular plastic into a unitary structure within the same mold.

References Cited in the file of this patent

UNITED STATES PATENTS

| | | |
|---|---|---|
| 1,393,541 | Kemp | Oct. 11, 1921 |
| 2,381,631 | Waring | Aug. 7, 1945 |
| 2,482,798 | Rheinfrank | Sept. 27, 1949 |
| 2,484,141 | Alex | Oct. 11, 1949 |
| 2,574,651 | Meyers | Nov. 13, 1951 |
| 2,589,786 | Engel et al. | Mar. 18, 1952 |
| 2,630,868 | Ellenberger | Mar. 10, 1953 |